Patented Dec. 29, 1942

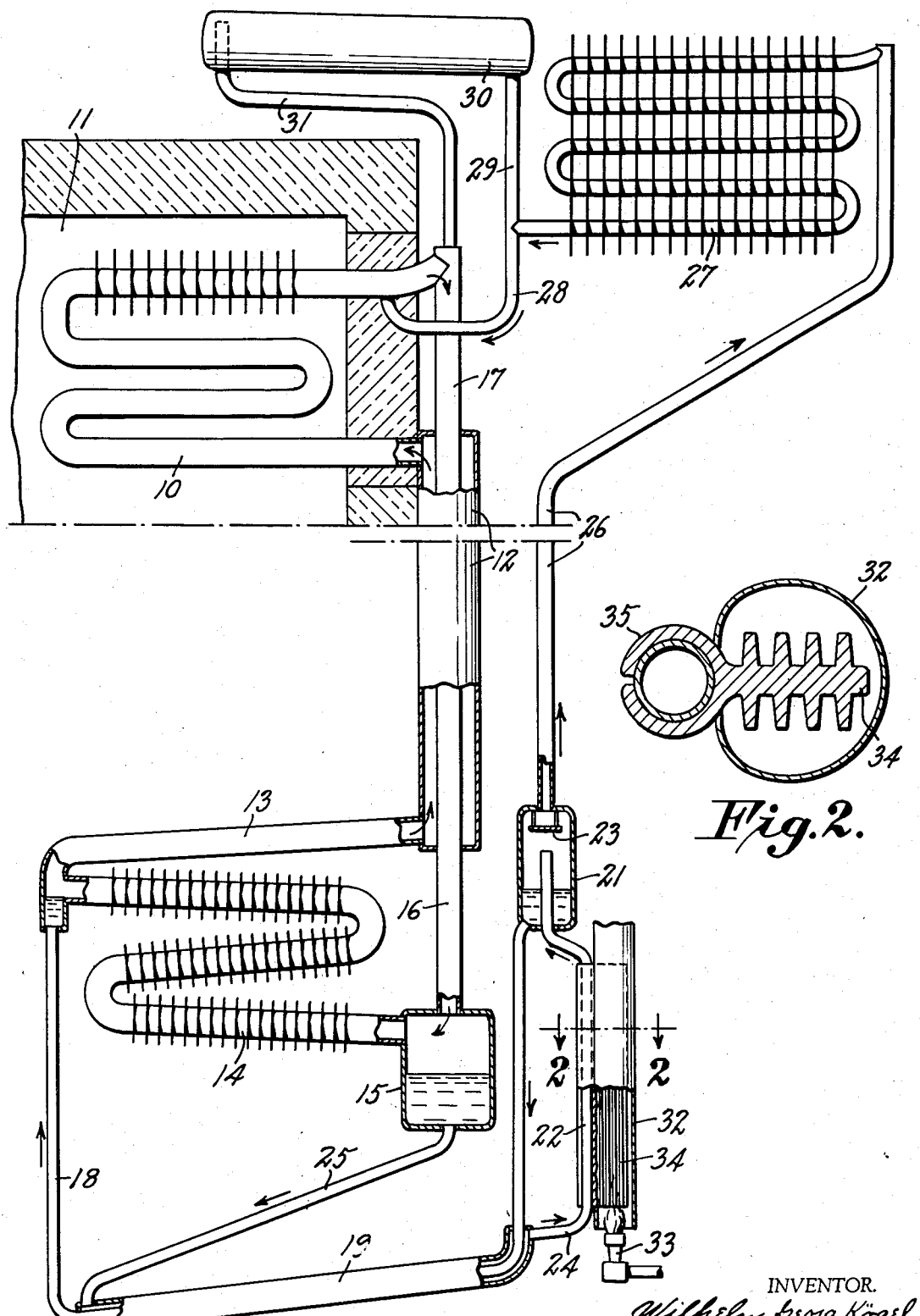

2,306,704

UNITED STATES PATENT OFFICE 2,306,704

REFRIGERATION

Wilhelm Georg Kögel, Evansville, Ind., assignor, by mesne assignments, to Servel, Inc., New York, N. Y., a corporation of Delaware Application September 12, 1939, Serial No. 294,425

5 Claims. (Cl. 62—119.5)

My invention relates to refrigeration and more particularly to heat operated absorption type refrigeration systems.

It is an object of the invention to effect an improvement in operation of such systems by providing a method and apparatus for applying heat to cause expulsion of refrigerant fluid from an absorbent, or circulation of a liquid absorbent, or both, in a manner to effect quick starting of operation of the system and proper relationship of refrigerant expulsion and absorption liquid flow.

My invention is especially advantageous in a system in which absorption liquid flow is carried out of vapor lift action, particularly when a non-volatile absorbent is employed.

Fig. 1 of the accompanying drawing is a more or less diagrammatic view of a uniform pressure absorption refrigeration system embodying the invention, and Fig. 2 is a detail sectional view on line 2—2 in Fig. 1.

An evaporator in the form of a pipe coil 10 is located in a refrigerator compartment 11. The lower end of evaporator 10 is connected through the outer passage of a gas heat exchanger 12 and a conduit 13 to the upper end of an air cooled absorber 14. An absorber vessel 15 is connected to the lower end of the absorber coil 14. The upper part of absorber vessel 15 is connected by a conduit 16, inner passage of gas heat exchanger 12, and a conduit 17 to the upper end of the evaporator 10.

The upper end of absorber 14 is connected by a conduit 18, inner passage of a liquid heat exchanger 19, and a conduit 20 to the lower part of a vessel 21. The upper end of a vertical conduit 22 juts upward into the upper part of the vessel 21. The upper end of conduit 22 is open. A baffle plate 23 is located in vessel 21 above the open upper end of conduit 22. The lower end of conduit 22 is connected by a conduit 24, outer passage of the liquid heat exchanger 19, and a conduit 25 to the lower part of absorber vessel 15.

The upper part of vessel 21 is connected by a conduit 26 to the upper end of an air cooled condenser 27. The lower end of condenser 27 is connected by a conduit 28 to the upper end of evaporator 10. The lower end of condenser 27 is also connected by a conduit 29 to one end of a vessel 30. The other end of vessel 30 is connected by a conduit 31 to the gas heat exchanger 12. Alongside of the vertical conduit 22 is a flue 32. A gas burner 33 is located adjacent the lower end of flue 32 and arranged so that the flame is projected upward into the flue. In the flue 32 there is a member 34 having an extensive heat transfer surface and formed of highly thermal conductive material. The member 34 is as long as the major portion of conduit 22. Member 34 has a portion 35 in the form of a sleeve which encircles said major portion of conduit 22.

The above parts associated and connected as described form an hermetically sealed system having all parts in open fluid communication and to which heat may be applied from the burner 33 through the heat transfer member 34 to conduit 22. By means of a charging plug (not shown) on absorber vessel 15, the system is evacuated and supplied with a solution of lithium nitrate and ammonia and hydrogen. The solution fills the lower part of the system to the level of the charging plug in the vessel 15, and the upper part of the system is filled with hydrogen gas and a small quantity of ammonia vapor. The solution is below saturation so that all of the lithium nitrate is in liquid form. The hydrogen is charged into the system at a pressure such that the total pressure in the system will be the condensing pressure of ammonia vapor at a fairly high room temperature.

In operation, heat from the burner 33 is applied to the member 34 in flue 32. Due to the high conductivity of member 34, the temperature of this member increases substantially uniformly throughout. Heat from the member 34 is transferred to conduit 22 through the sleeve 35. Solution in conduit 22 is heated so that ammonia vapor is expelled from the solution. The internal diameter of conduit 22 is preferably sufficiently small that vapor and liquid have difficulty in passing each other in this conduit, so that the ammonia vapor expelled from solution displaces liquid in which it is trapped and the liquid and vapor rise together through conduit 22 upward into vessel 21 by what is referred to as vapor lift action.

Ammonia vapor flows from vessel 21 through conduit 26 to condenser 27. Ammonia vapor is cooled and liquefied in condenser 27. Liquid ammonia flows from condenser 27 through conduit 28 into the upper part of evaporator 10. The liquid ammonia flows downward in evaporator 10 and evaporates and diffuses into hydrogen contained in the evaporator.

The resulting mixture of ammonia vapor and hydrogen gas flow from the upper end of evaporator 10 through conduit 17, gas heat exchanger 12, and conduit 16 to vessel 15 and thence into absorber coil 14. Absorption solution flows from vessel 21 through conduit 20, liquid heat exchanger 19, and conduit 18 into the upper end of absorber coil 14. The absorption solution flows downward through coil 14 into vessel 15. Ammonia vapor is absorbed by solution flowing in coil 14 and vessel 15. Hydrogen gas flows from the upper end of absorber 14 through conduit 13 and gas heat exchanger 12, back to the evaporator 10. Absorption solution flows from absorber vessel 15 through conduit 25, liquid heat exchanger 19, and conduit 24 back to the lower end of conduit 22.

The evaporation of ammonia in evaporator 10 produces a refrigerating effect for cooling air or freezing ice, or both, in refrigerator compartment 11. The circulation in the gas circuit occurs as described for the reason that ammonia vapor is heavier than hydrogen gas. In the gas circuit there are two columns of gas. Gas leaving the evaporator is heavier than gas leaving the absorber because ammonia vapor is added in the evaporator and removed in the absorber. The production of refrigeration by evaporation of ammonia in the evaporator depends upon removal of ammonia vapor from hydrogen in the absorber. Therefore, the column of gas in which the absorber is connected is the lighter rising column, and the direction of flow in the evaporator depends upon whether it is connected in the rising column or the descending column.

In the liquid circuit, absorption solution flows by gravity from vessel 21 through the heat exchanger, through the absorber, and again through the heat exchanger to the lower end of conduit 22. The liquid is lifted through conduit 22 by vapor lift action as previously described.

The vessel 30 ordinarily contains a reserve supply of hydrogen gas. Upon increase in room temperature and necessary condenser pressure, ammonia vapor from condenser 27 displaces hydrogen from vessel 30 into the gas circuit so that the total pressure in the system increases and refrigeration continues with condensation of ammonia vapor at a correspondingly higher pressure.

Baffle 23 in vessel 21 prevents splashing of solution into vapor conduit 26. Due to the small diameter of conduit 22, the heat capacity of liquid in this conduit is small and, upon starting of the system, this liquid is quickly brought to the temperature at which ammonia vapor is expelled. Due to the uniform heating of conduit 22, by reason of the high heat conductivity and extensive heat transfer surface of member 34, as previously explained, a sufficient quantity of vapor is formed in conduit 22 to produce vapor lift action for causing upward flow of liquid in conduit 22 as soon as the vapor expulsion temperature is reached. There is therefore no overheating at any local point in conduit 22. Neither is there any appreciable vapor expulsion from solution in conduit 22 without movement of liquid upward in this conduit. There is therefore no plugging of conduit 22 by deposit of solid lithium nitrate on account of liquid reaching saturation at a local point in the conduit. The small diameter of conduit 22 provides for two things, a small heat capacity generator akin to a flash boiler for quick starting, and vapor lift action for causing circulation of solution. The length of conduit 22 is such that heat is applied to enough liquid to expel an amount of vapor per unit of time to produce vapor lift action that will cause circulation at a rate required by the capacity of the unit. For larger capacity units, instead of lengthening conduit 22, a plurality of such conduits may be provided in parallel.

Various changes and modifications may be made within the scope of the invention which is not limited except as set forth in the following claims.

What is claimed is:

1. In absorption refrigeration apparatus of the kind operated by heat including a plurality of interconnected parts forming an absorption liquid circuit, one of said parts comprising a riser tube in which liquid is adapted to be raised by vapor-lift action to cause circulation of absorbent in said circuit, a fuel burner removed from at least a part of said riser tube and providing heat at a desired temperature, a vertically extending flue into the lower end of which projects the flame produced by said burner, and structure comprising material possessing a high thermal conductivity having one part thereof disposed within said flue and another part embracing a major portion of the circumference of said tube, the parts of said structure within said flue and embracing said riser tube extending longitudinally of said riser tube for a major portion of its length.

2. In absorption refrigeration apparatus of the kind operated by heat including several interconnected parts forming an absorption liquid circuit containing an absorbent, one of said parts comprising a riser tube in which liquid is adapted to be raised by vapor-liquid lift action to cause circulation of absorbent in said circuit, a source of heat removed from at least a part of said riser tube and providing heat at a desired temperature, structure for taking up heat from said source and transferring said heat in sensible form to said tube to effect heating of the latter, said structure comprising a block of material of high thermal conductivity having one part embracing a major portion of the circumference of said tube and extending lengthwise thereof for a major portion of its length and another part projecting away from said tube, and said other part being subjected to the heating effect of said heat source and being more massive than said one part to facilitate and promote rapid transfer of heat throughout the length of said block, so that substantially uniform heating of said tube is effected along the length of said one part of the block.

3. In absorption refrigeration apparatus of the kind operated by heat, a plurality of interconnected parts forming an absorption liquid circuit containing an absorbent, one of said parts comprising a tube in which refrigerant is expelled from the absorbent by heating, a source of heat providing heat at a desired temperature, and structure for taking up heat from said heat source and transferring heat in sensible form to said tube, said structure including material possessing high conductivity having one part embracing a major portion of the circumference of said tube and another part contiguous to said one part, and said other part being more massive than said one part and arranged to be subjected to the heating effect of said heat source to facilitate rapid transfer of heat through said other part in a direction lengthwise of said tube so that substantially uniform heating of said tube is readily effected by said one part.

4. In absorption refrigeration apparatus as set forth in claim 3, in which said heat source constitutes a heating medium, and a member for guiding said heating medium over the surfaces of said other part of said structure.

5. In absorption refrigeration apparatus as set forth in claim 3, in which said heat source constitutes a fuel burner, and a flue within which said other part is disposed and into the lower end of which is adapted to project the flame produced by said burner.

WILHELM GEORG KÖGEL.